United States Patent
Fair

(10) Patent No.: US 11,426,811 B2
(45) Date of Patent: Aug. 30, 2022

(54) HOLLOW GEAR HOB

(71) Applicant: HYPERION MATERIALS & TECHNOLOGIES (SWEDEN) AB, Stockholm (SE)

(72) Inventor: Jonathan Fair, West Midlands (GB)

(73) Assignee: HYPERION MATERIALS & TECHNOLOGIES (SWEDEN) AB, Stockholm (SE)

( * ) Notice: Subject to any disclaimer, the term of this patent is extended or adjusted under 35 U.S.C. 154(b) by 564 days.

(21) Appl. No.: 16/572,178

(22) Filed: Sep. 16, 2019

(65) Prior Publication Data

US 2020/0038979 A1 Feb. 6, 2020

Related U.S. Application Data

(62) Division of application No. 14/914,777, filed as application No. PCT/IB2014/059795 on Mar. 14, 2014.

(60) Provisional application No. 61/889,105, filed on Oct. 10, 2013.

(51) Int. Cl.
| | |
|---|---|
| *B23K 20/00* | (2006.01) |
| *B23F 21/16* | (2006.01) |
| *B23C 5/00* | (2006.01) |
| *B23F 23/12* | (2006.01) |
| *B23C 5/04* | (2006.01) |
| *B23P 15/28* | (2006.01) |

(52) U.S. Cl.
CPC .............. *B23F 21/16* (2013.01); *B23C 5/003* (2013.01); *B23C 5/006* (2013.01); *B23C 5/04* (2013.01); *B23F 23/1206* (2013.01); *B23K 20/00* (2013.01); *B23P 15/28* (2013.01); *B23C 2222/28* (2013.01); *B23C 2228/49* (2013.01); *B23C 2250/16* (2013.01)

(58) Field of Classification Search
CPC ................................. B23K 20/00; B23F 21/16
See application file for complete search history.

(56) References Cited

U.S. PATENT DOCUMENTS

| | | | | | |
|---|---|---|---|---|---|
| 3,715,787 | A | * | 2/1973 | Hudson | F16C 19/55 407/120 |
| 3,786,719 | A | * | 1/1974 | Kimura | B23F 5/22 407/26 |
| 4,881,431 | A | * | 11/1989 | Bieneck | B21C 25/02 76/108.6 |
| 6,634,835 | B1 | * | 10/2003 | Smith | B23Q 11/10 407/11 |
| 10,518,345 | B2 | * | 12/2019 | Fair | B23C 5/003 |
| 2003/0002928 | A1 | * | 1/2003 | Soltau | B23F 21/16 407/119 |
| 2003/0017013 | A1 | * | 1/2003 | Soltau | B23F 23/1243 407/30 |
| 2003/0035747 | A1 | * | 2/2003 | Anderson | C22C 33/0264 419/25 |
| 2004/0131434 | A1 | * | 7/2004 | Giessler | B23G 5/005 408/59 |
| 2005/0211016 | A1 | * | 9/2005 | Ouchterlony | C22C 29/08 51/307 |

(Continued)

*Primary Examiner* — Erin B Saad

(57) ABSTRACT

A hob for a cutting apparatus including a hollow body of a sintered hard metal composition and a cavity located within the body, the cavity having a volume in the range of about 10% to about 90% of the volume of the body.

9 Claims, 9 Drawing Sheets

(56) References Cited

U.S. PATENT DOCUMENTS

| | | | |
|---|---|---|---|
| 2008/0298913 A1* | 12/2008 | Young | B23C 5/10 408/143 |
| 2011/0243671 A1* | 10/2011 | Kretschmer | B23C 5/04 407/25 |
| 2012/0093592 A1* | 4/2012 | Durst | B23G 7/02 408/144 |
| 2013/0223943 A1* | 8/2013 | Gey | B23B 27/14 408/199 |
| 2016/0207128 A1* | 7/2016 | Fair | B23C 5/003 |

* cited by examiner

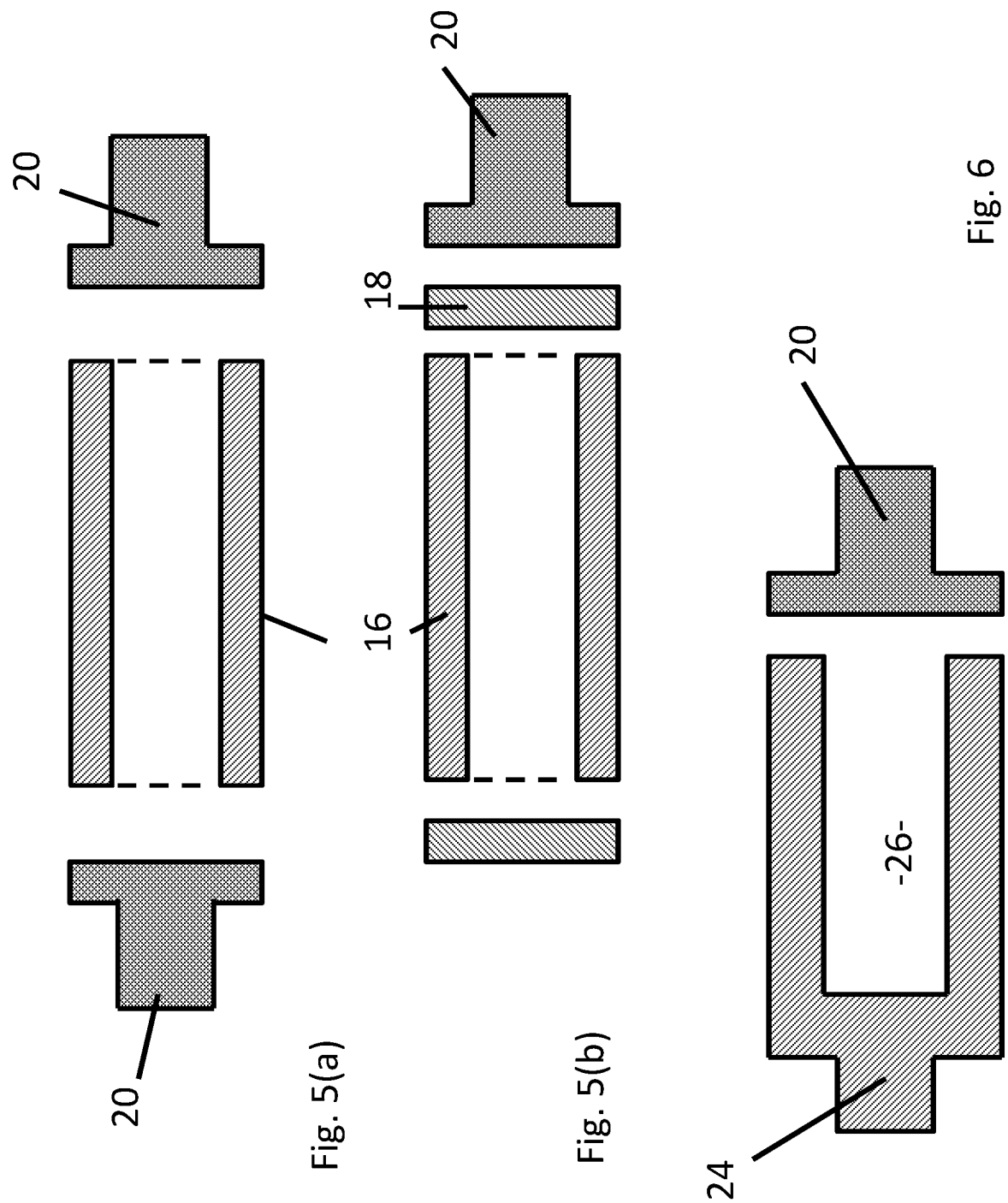

HOLLOW GEAR HOB

RELATED APPLICATION DATA

This application is a divisional of US application Ser. No. 14/914,77, filed Feb. 26, 2016, which is a § 371 National Stage Application of PCT International Application No. PCT/IB2014/059795 filed Mar. 14, 2014 claiming priority of U.S. Provisional Patent Application No. 61/889,105, filed Oct. 10, 2013.

TECHNICAL AND INDUSTRIAL APPLICABILITY

A hollow hob for a cutting tool comprising a body of a sintered hard metal composition and at least one cavity located within the body, characterized in that the cavity has a volume in the range of about 10% to about 90% of the volume of the body.

BACKGROUND

Common materials for hobbing in the gear cutting industry include high speed steel (HSS) and solid carbide (SC). Although HSS tools offer lower cost solutions, wear and reliability are issues. High wear resistant materials, such as cemented carbide, are popular for metal drilling and cutting tools.

Solid carbide hobs offer high cutting speeds, but the larger module sizes are very heavy and therefore both difficult for customers to handle and can be too heavy for the machine on which the tool is to be used. Indexable hob solutions for module sizes 4 and are commercially available. However, variation in the location of the inserts limits tolerances to quality class B approximately to DIN 3968 and/or BS ISO 4468 in most situations.

Another disadvantage with the presently available solid carbide hobs is cost. Raw material costs are the major contribution to expensive production costs. Moreover, current solid carbide hobs don't allow the introduction of cutting coolant/lubricant or vibration damping.

SUMMARY

In one embodiment, a hob for a cutting apparatus includes a body of a sintered hard metal composition, and a cavity located within the body, the cavity having a volume in the range of about 10% to about 90% of the volume of the body.

In another embodiment, a method of forming a hollow hob of a cutting apparatus includes the steps of providing a body of a sintered hard metal composition, wherein a cavity is located within the body, the cavity having a volume in the range of about 10% to about 90% of the volume of the body; and fusing at least one sintered part to the body.

In yet another embodiment, a cutting tool for a cutting apparatus includes a body of a sintered hard metal composition and at least one cavity located within the body. The cavity has a volume in the range of about 10% to about 90% of the volume of the body. At least one sintered part is fused to the body.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIGS. 5(a)-5(c) are cross-sections of other embodiments of a hollow hob according to the present disclosure.

FIG. 6 is yet another embodiment of a hollow hob according to the present disclosure.

DETAILED DESCRIPTION

Figure 1:
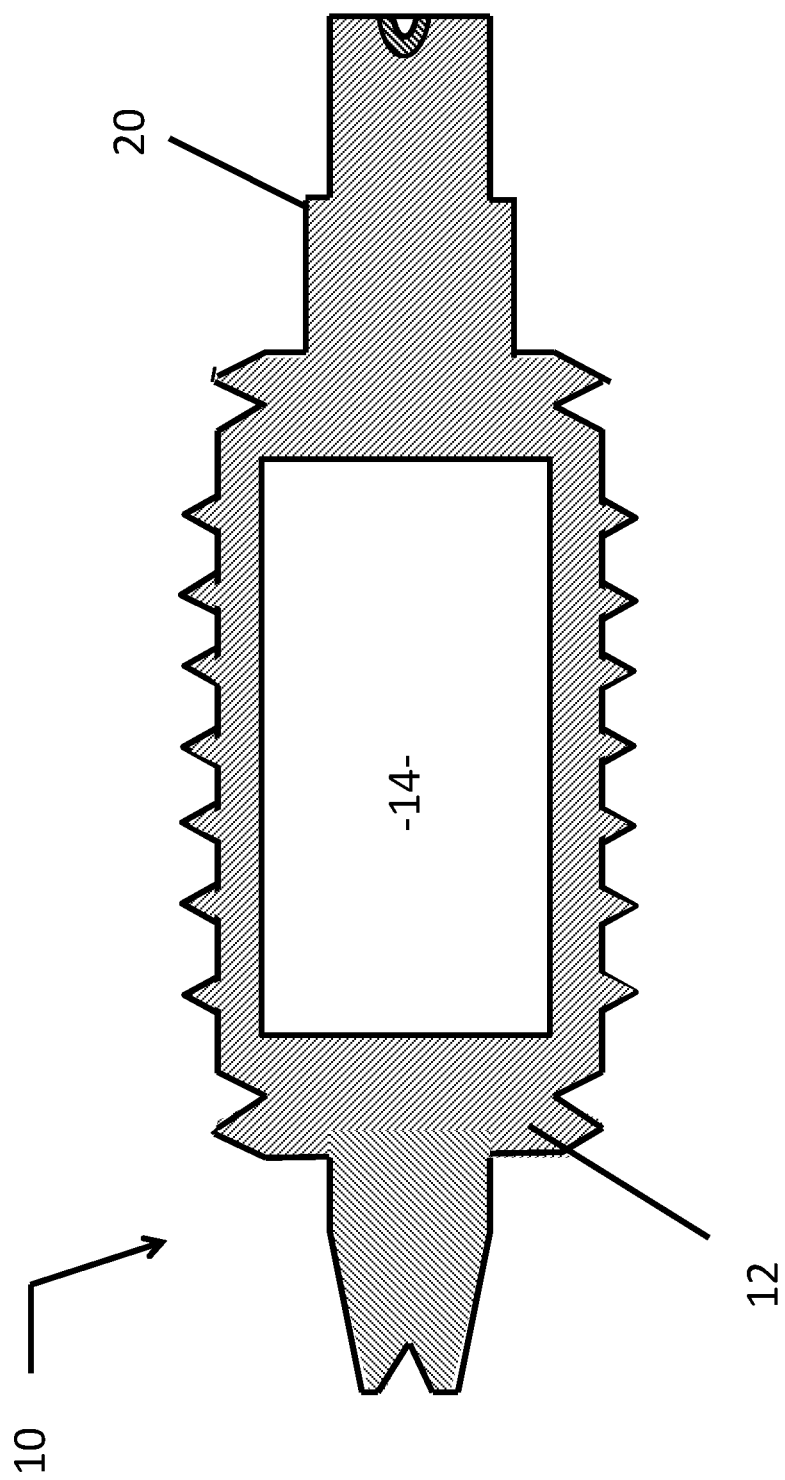
FIG. 1 is a cross-section of a cutting tool having a hollow hob according to an embodiment of the present disclosure.
Figure 2:
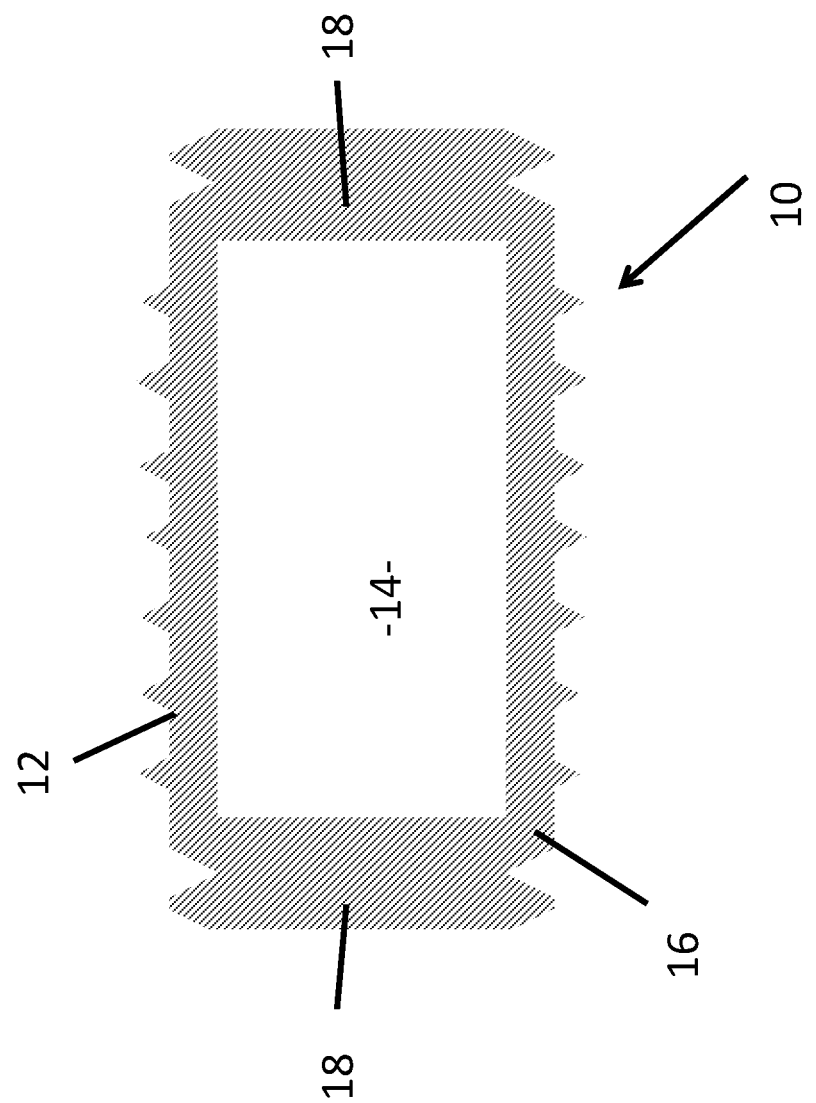
FIG. 2 is an enlarged cross-section of the hollow hob of FIG. 1.

Referring to FIGS. 1 and 2, a hob 10 according to a present embodiment has a body 12 of a sintered hard metal composition of material. A hard metal composition is a composite material normally having a hard phase composed of one or more carbides, nitrides or carbonitrides of tungsten, titanium, chromium, vanadium, tantalum, niobium (or similar) bonded by a metallic phase, typically cobalt, nickel, iron (or combinations) or similar in varying proportions. Body 12 can be solid cemented carbide. Solid cemented carbide describes specified hard particulates combined with a specified binder alloy. For example, tungsten carbide bonded or cemented together by a cobalt alloy binder.

However, similarly to the above, solid cemented carbide may be tungsten, silicon, niobium, titanium, vanadium, chromium, tantalum, nickel, cobalt, or combinations thereof. The binder may often be cobalt or nickel. It should be appreciated that other materials for the members are contemplated by the present embodiments and therefore such should not be limited by a specific material.

Body 12 is a solid body of such material and is usually made by powder metallurgical methods, namely, but not limited to, for example, by pressing and sintering. The term solid body is defined as one contiguous, unitary body of material. However, the solid body is not limited to a specific homogenous composition, but may have a gradient, wherein relevant abundance of constituents vary across the body. It should also be appreciated that the composition of material is not limited to specific gradients.

Body 12 has at least one cavity 14. Cavity 14 has a volume in the range of about 10% to about 90% of the volume of the body. Hence, the hollow solid carbide hob 10 of the present embodiments would be lower in weight and therefore easier to handle, possible for machines to support and possible to achieve A or AA quality tolerances, according to DIN 3968 and/or BS ISO 4468, in solid carbide hobs in larger sizes than previously practical.

Figure 3:
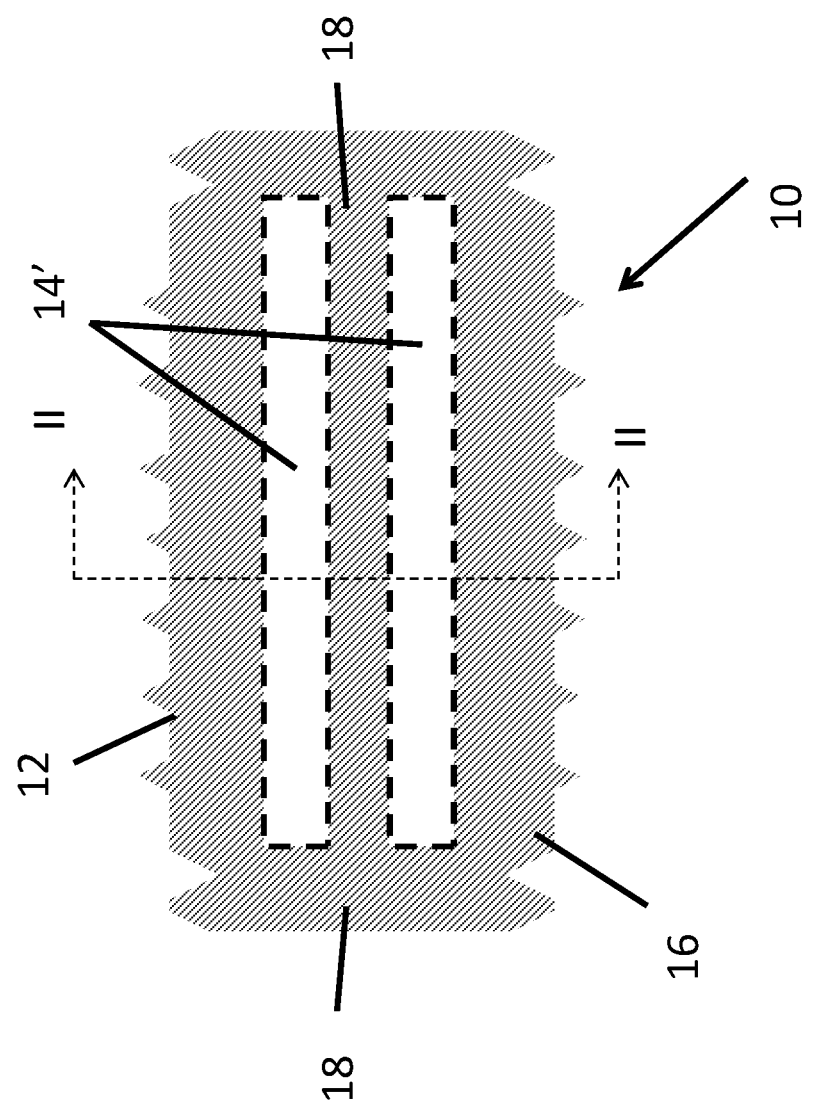
FIG. 3 is a cross-section of another embodiment of a hollow hob.
Figure 4:
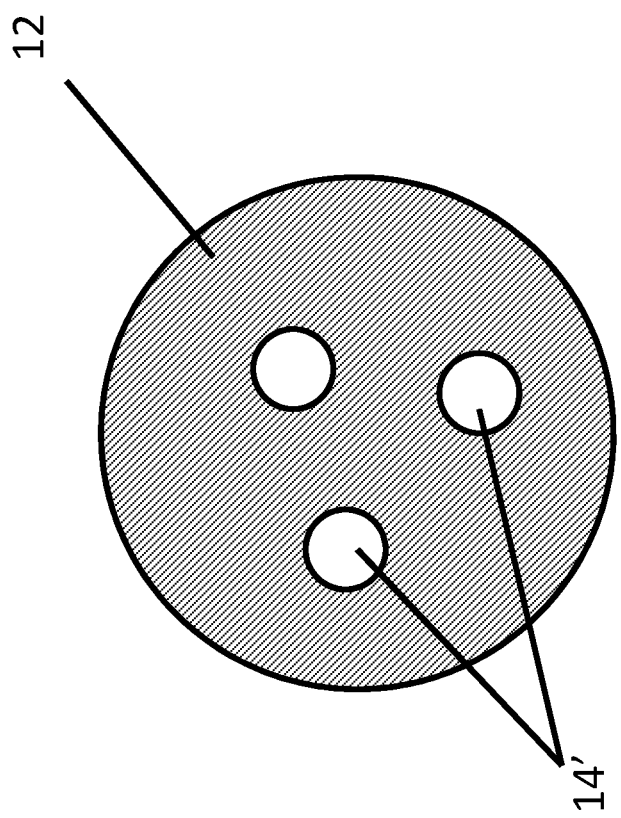
FIG. 4 is a cross-section taken along line II-II of FIG. 3.

As shown in FIGS. 3 and 4, body 12 can have a plurality of cavities 14'. The specific number and position of the cavities in body 12 being dependent on the particular end use of the hob. Moreover, the particular shape of the cavities can vary and although not shown, numerous different shapes of cavities are contemplated by the present disclosure. The total volume of the cavities can be of about 10% to about 90% of the volume of the solid body. Body 12 could be formed, for example, by extrusion, to have multiple cavities extending partially or through its entire length.

Body 12 of the hob includes a core 16 having opposed ends. An end plate 18 can be attached at each end of the core to form cavity 14 (14'). Each of the plates can be produced separately, for example, by direct pressing. As will be described further herein, after sintering the parts, core 16 and end plates 18 can be assembled and fused together, leaving the internal space or cavity 14. End plates 18 can be cemented carbide of the same composition as core 16, or two or more different compositions and being different with respect to composition and/or grain size that are fused together, this would allow increased use of recycled material as compared to the core.

Figure 5C:
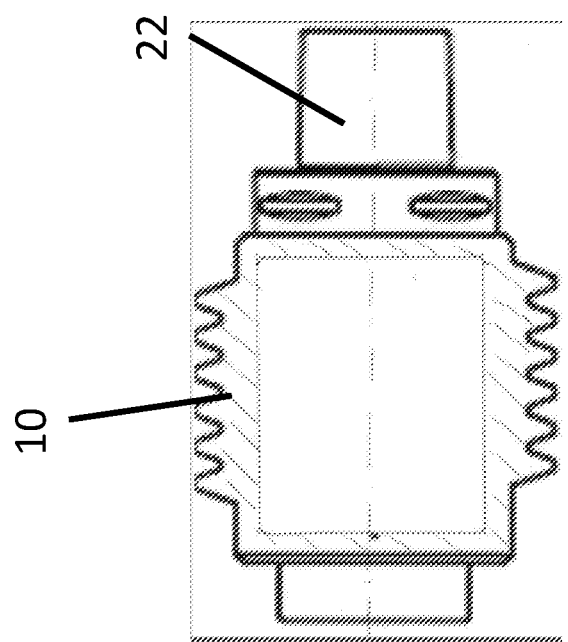

The hob of the present invention can have a plurality of different sintered parts fused to core 16 or end plates 18, depending upon the desired end use of the hob. Referring to FIGS. 5(*a*)-5(*c*), core 16 can have shank ends 20 attachable directly to the ends of core 16 (FIG. 5(*a*)). Alternatively, a shank end 20 can be fused to an end plate and then to the core (FIG. 5(*b*)). For example, body 12 can have a Capto® coupling (Sandvik Coromant, Gimo, SE) attached thereto as shown in FIG. 5(*c*). It should be appreciated that a variety of parts can be fused or attached to the hob. For example, mantles, arbors, shanks, couplings, shafts and/or any other component or element. As discussed above, the elements fused to the core can be the same or different cemented carbide than the body or any other suitable material.

As shown in FIG. 6, body 12 can be formed as a partially enclosed hob component 24 having a cavity 26. One end of component 24 is enclosed the other end is open and sealable by end plate 18, or any other element. Cavity as used herein refers to an enclosed cavity, as well as, a recess formed in the body.

Figure 7:
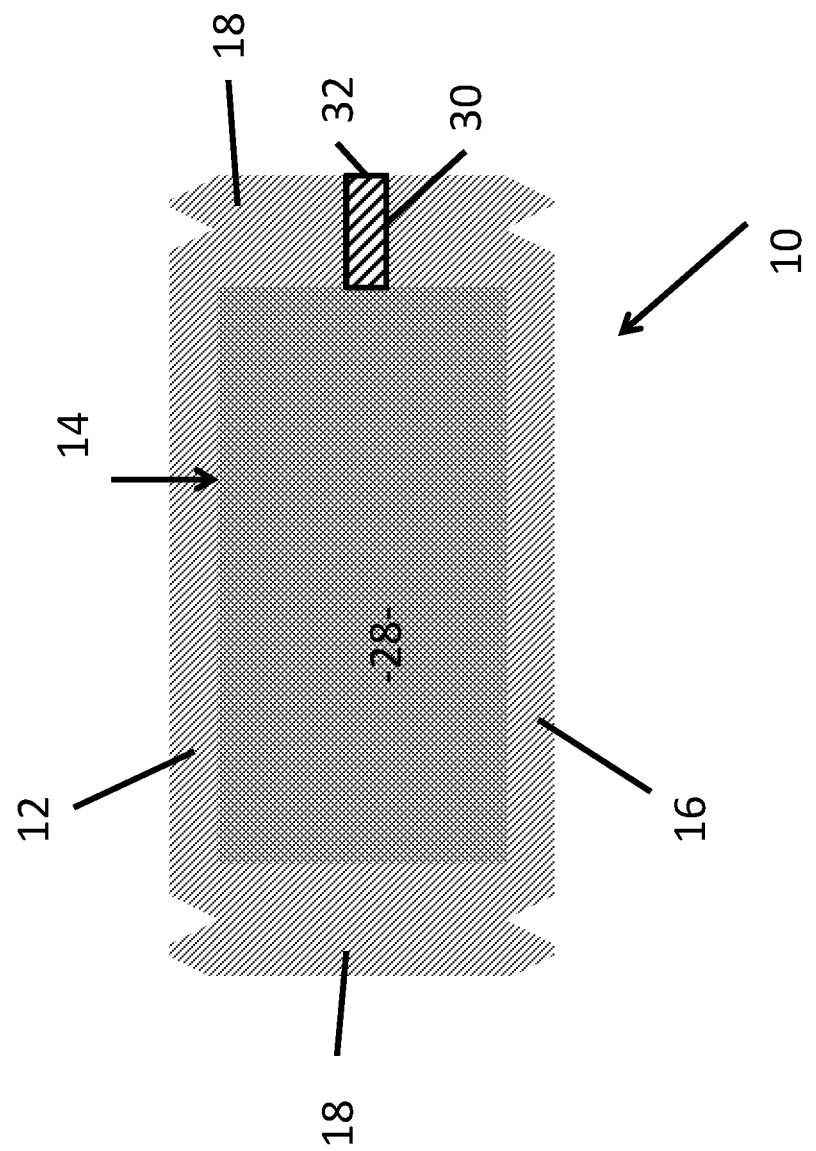
FIG. 7 is still another embodiment of a hollow hob according to the present disclosure.

Referring to FIG. 7, cavity 14 can be filled with a vibration damping medium 28. Medium 28 can be introduced to cavity 14 through a channel 30 provided in the end plate 18 that is then subsequently sealed, e.g. with a steel plug 32. It should be appreciated that the cross-section of the channel leading to the cavity is less than the cross-section of the cavity.

Figure 8:
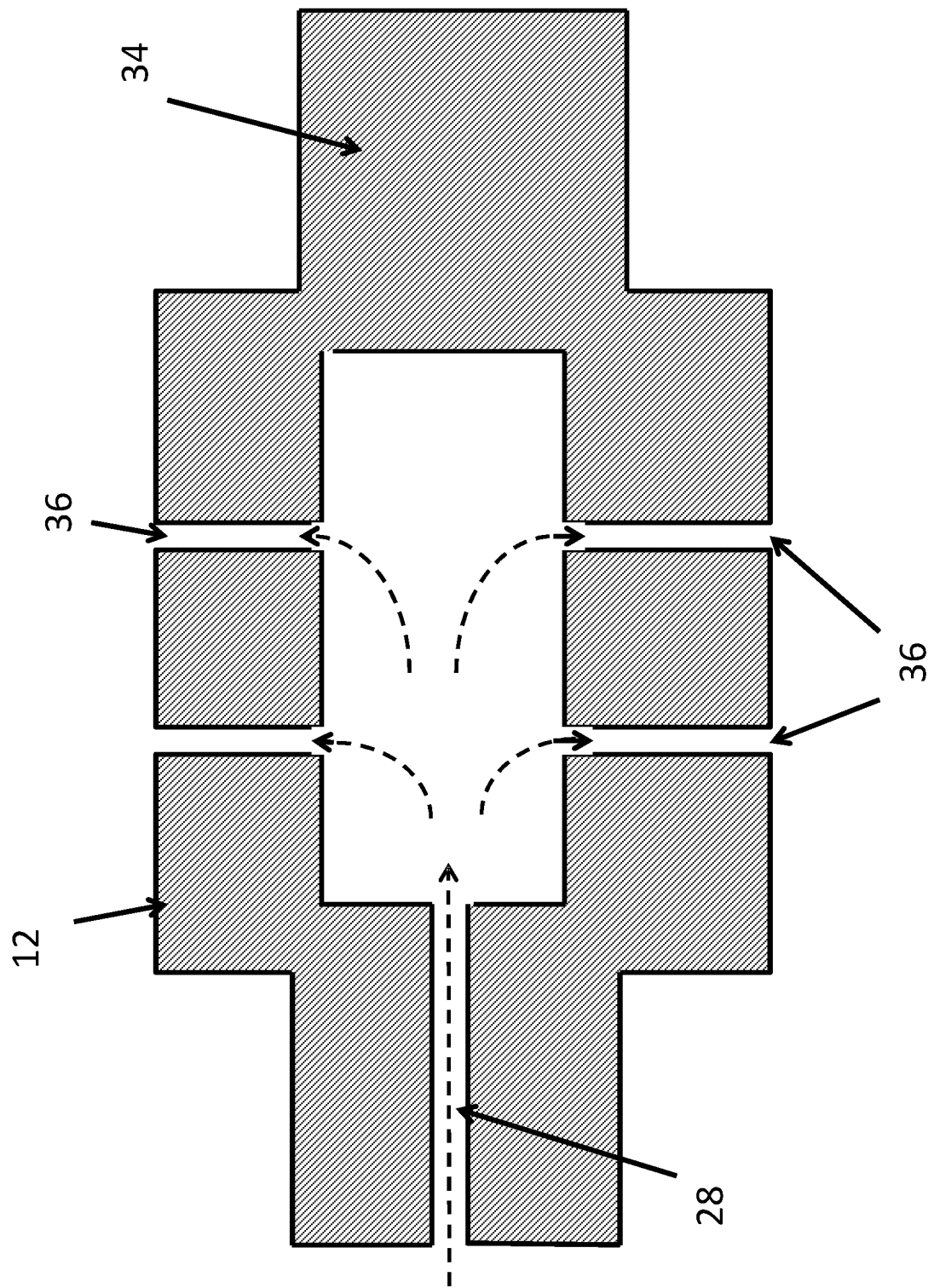
FIG. 8 is another embodiment of a hollow hob according to the present disclosure.

Referring to FIG. 8, and as described supra, a sintered part 34, such as an arbor or shank, can be fused to body 12. Body 12 can include coolant holes 36 therein. Coolant may be introduced into a cavity 14" through channel 30 provided in the shank plate and exit via holes 34 to direct lubrication/cooling/flushing fluid directly to the cutting edge rather than flood cooling as is common today.

Figure 9:
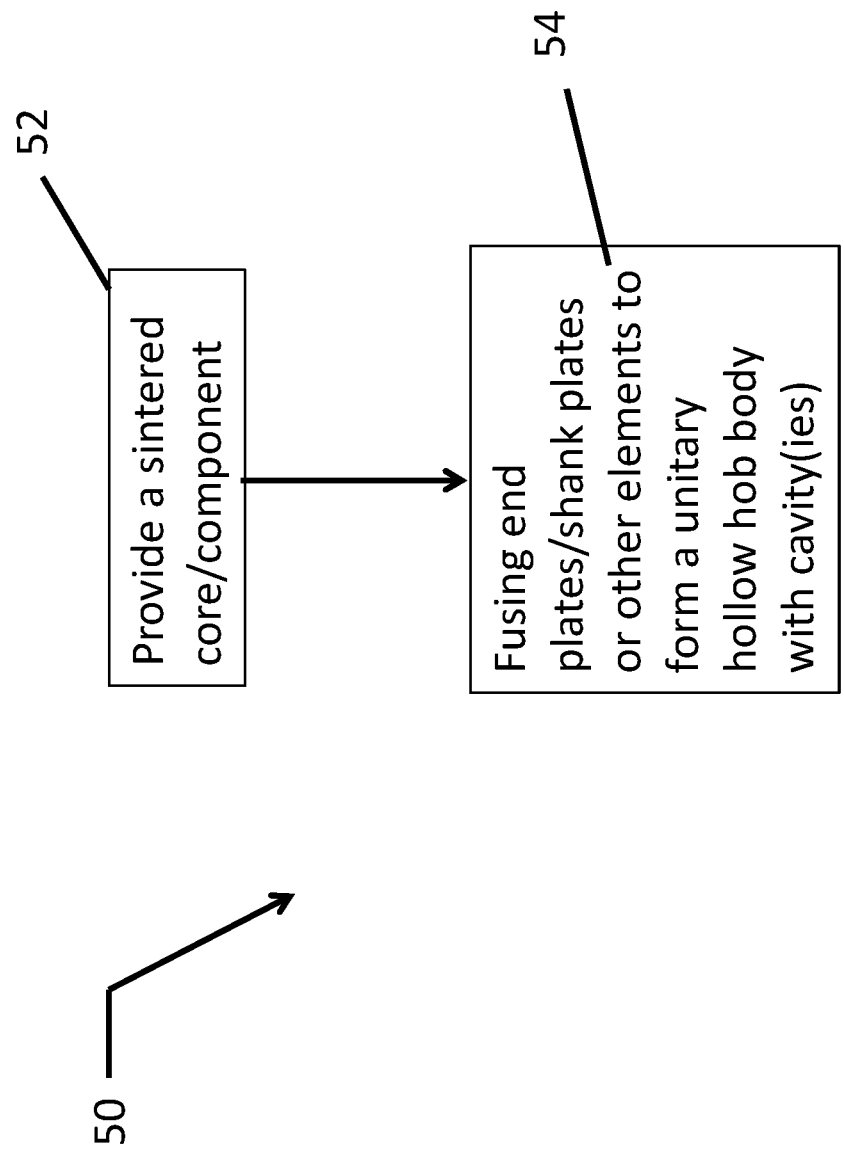
FIG. 9 is a flow diagram illustrating a method of forming a hollow hob according to the present disclosure.

Referring to FIG. 9, a method 50 of forming a hollow hob of a cutting tool according to the present embodiments is described. In step 52 a body 12 of the hob is provided. Body 12 has been sintered for obtaining substantially the full density and hardness thereof. As described above, body 12 can be a core 16 or component 24 having the desired shape.

In step 54 at least one cavity 14 is formed in body 12 by fusing at least one sintered part such as an end plate/shanks 18 and or any other part to core 16/component 24 to enclose the cavity(ies) 14, 14', 14". As described above, cavity 14 has a volume of about 10% to about 90% of the volume of the body. Plates 18 can be machined with channel(s) 28 or other features prior to sintering.

After the sintered members are assembled to form the desired shape of the hob and cavity heating occurs. Heating the members in the assembled relationship is employed to fuse the members together in such a way that one solid unitary hollow hob body 12 is formed. No filler material or attachment material, such as brazing, is needed to attach the end plates or other parts to the core/component to form the body and cavity.

During fusing the assembled materials are subject to a vacuum or gas atmosphere, without the application of external pressure, and to a temperature sufficient to fuse the at plurality of materials together at the to form the unitary body. For example, at a temperature of about 1340° C. to about 1360° C.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A method of forming a hob of a cutting apparatus, comprising:
providing a hollow body of a sintered hard metal composition, wherein at least one cavity is located within the body, the at least one cavity having a volume in the range of about 10% to about 90% of the volume of the body, and at least one sintered part is fused to the body, and wherein providing the hollow body includes providing a core having opposed sides and fusing a sintered element fused to each side of the core so as to seal the at least one cavity.

2. The method according to claim 1, wherein the hard metal composition is solid cemented carbide.

3. The method according to claim 1, wherein the hard metal composition is tungsten carbide bonded with a cobalt alloy binder.

4. The method according to claim 1, wherein the hard metal composition is selected from the group consisting of tungsten, silicon, chromium, vanadium, tantalum, niobium, titanium, nickel, cobalt, iron and combinations thereof.

5. The method according to claim 1, wherein the core and each sintered element are cemented carbide of the same composition or one or more different compositions.

6. The method according to claim 1, wherein the at least one sintered part is a cemented carbide.

7. The method according to claim 1, further comprising the step providing a vibration dampening medium within the at least one cavity.

8. The method according to claim 1, further comprising forming a plurality of coolant holes in the body.

9. The method according to claim 1, further comprising providing a plurality of cavities in the body, the total volume of the plurality of cavities being about 10% to about 90% of the volume of the body.

* * * * *